Figure 1:
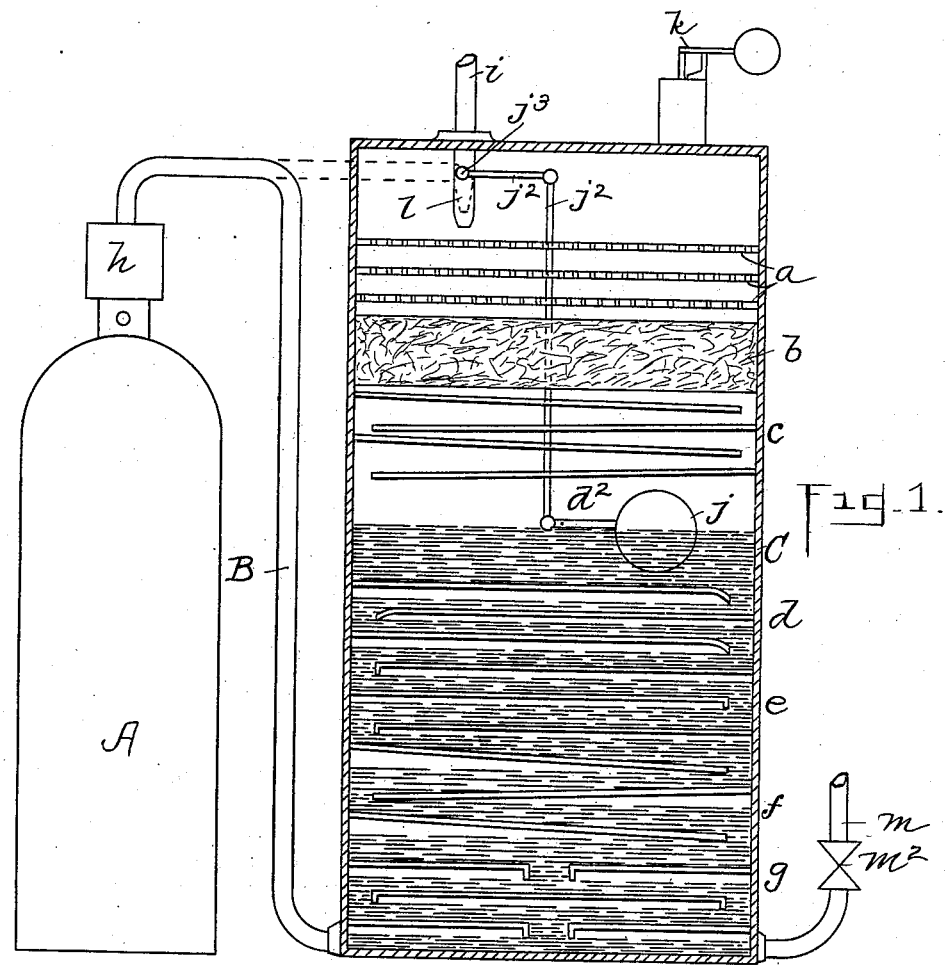

No. 608,397. Patented Aug. 2, 1898.
J. SCHWARTZ, Jr.
METHOD OF AND APPARATUS FOR CHARGING LIQUIDS WITH GAS.
(Application filed Dec. 20, 1897.)
(No Model.)

WITNESSES.
Matthew M. Blunt
J. Mushling

INVENTOR.
John Schwartz Jr.
by Jas. H. Churchill
ATT'Y.

UNITED STATES PATENT OFFICE.

JOHN SCHWARTZ, JR., OF LONDON, ENGLAND, ASSIGNOR TO HENRY CARMICHAEL, OF MALDEN, MASSACHUSETTS.

METHOD OF AND APPARATUS FOR CHARGING LIQUIDS WITH GAS.

SPECIFICATION forming part of Letters Patent No. 608,397, dated August 2, 1898.

Application filed December 20, 1897. Serial No. 662,527. (No model.) Patented in England April 28, 1894, No. 8,484.

*To all whom it may concern:*

Be it known that I, JOHN SCHWARTZ, Jr., a subject of the Queen of Great Britain, residing in London, England, have invented an Improvement in Methods of and Apparatus for Charging Liquids with Gas, (for which I have obtained a patent in England, No. 8,484, dated April 28, 1894,) of which the following description, in connection with the accompanying drawings, is a specification, like letters and figures on the drawings representing like parts.

This invention relates to a novel method and apparatus for charging liquids with gas, and is especially applicable for charging water with carbonic-acid gas, whereby aerated waters or beverages can be produced readily and as required without the manual operations which have hitherto been necessary, and so that the necessity of storing in bottles large quantities of aerated waters or beverages for consumption is obviated, thereby doing away with heavy factory expenses and cost of plants and bottles and of distribution.

In accordance with this invention the carbonic-acid gas is introduced at the bottom of a vessel containing the water to be charged and accumulates in the upper part of said vessel to form an elastic body or cushion of gas, and on its ascent through said vessel a portion of the said gas is caught in a plurality of traps or pockets arranged in a vertical series and immersed in a body of liquid or water, which is admitted into the vessel at its top and is spread so as to make extended contact with the volume of gas, down through which it passes, and is collected in the lower part or half of said vessel. The admission of the liquid is preferably automatically controlled by the level of the liquid contained in said vessel, and the pressure of the gas may be automatically controlled, so that the gas may be admitted into the vessel at a lower pressure than the water.

According to my invention I provide, in connection with the water-supply—such as a town water-service—a cylinder or container for compressed carbonic-acid gas, which latter is connected with the bottom of the aerating chamber or vessel below the traps therein, while the water-supply may and preferably will be connected to the vessel or chamber at its upper end and may be provided with a valve automatically controlled, as will be described, so as to regulate the supply of water according to the level of the water in the said vessel or chamber. The aerating vessel or chamber may be provided with a valve set so as to open at a pressure between that of the water and that of the gas to allow the water to enter, but to close when the gas is entering. If the pressure of the water be not sufficient to allow of its entering the aerating vessel or chamber by its own pressure, I may combine with the apparatus an injector or equivalent device which can be worked by the pressure of the gas, so as to force in the water, and this will assist in the absorption of the gas by the water.

These and other features of this invention will be pointed out in the claims at the end of this specification.

Figure 2:
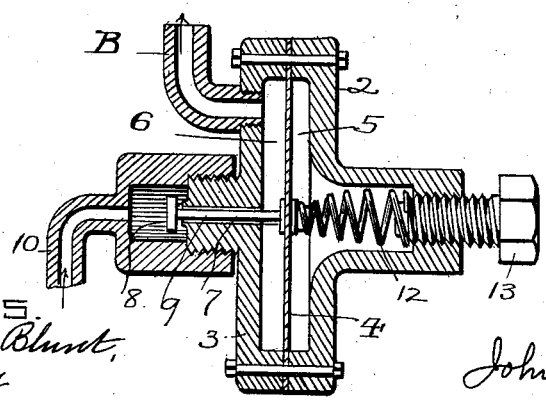

Figure 1 represents in section and elevation one form of apparatus embodying this invention; and Fig. 2, a sectional detail, on an enlarged scale, to be referred to.

Referring to the drawings, A represents a cylinder or container for compressed carbonic-acid gas, communicating by pipe or passage B with the mixing or absorption chamber or vessel C, the pipe B being connected to the said vessel or chamber near its bottom. In the upper part of the vessel C, as herein shown, is arranged a distributer for the water, which may be a series of perforated plates $a$, which are placed a short distance apart, one above another. Upon the upper plate of the series of plates the water entering by the pipe $i$ falls and passes thence through perforations in this plate in a divided condition onto the next plate below, and so on through the perforations in the several plates in the form of a shower, or instead of perforated plates a layer or bed of insoluble material, such as broken glass or animal or vegetable charcoal $b$, may be employed, by which the water is purified and presented in a form for more efficiently absorbing the gas.

Instead of or in combination with the bed of insoluble material or the perforated plates there are arranged in the vessel a number of inclined plates, as shown at $c$, over the surface of which the water is caused to pass downward and present an extended surface of the water to the atmosphere of gas admitted to the vessel. Below the plates $c$, over which thin layers of liquid are extended in contact with a body of gas, are located a second series of plates, which are immersed in a body of liquid accumulated in the vessel C. The lower edges of these immersed plates or some of them are preferably curved downward, as shown at $d$, or are provided with lips, as shown at $e$, or the plates may be sufficiently inclined, as shown at $f$, to retain a layer of gas on the under side of the immersed plates. The plates may be horizontal and be provided alternately with openings in the center and edges, as shown at $g$, the openings being provided with depending lips or rims, as shown, to retain a layer of gas beneath the plates.

The immersed plates above referred to constitute a series of gas-traps, beneath which a volume of the gas is caught or trapped, so as to form a vertically-arranged series of layers of gas in a substantially static condition immersed in a continuous body of liquid, which in the present instance fills the vessel C above the plates $d$ and to a point between the plates $d$ and the plates marked $c$. Between the compressed-gas retainer A and the vessel C may be located an automatic gas pressure and supply regulator $h$ of any known or suitable construction which will admit gas to the vessel C at a less pressure than that at which the water enters the said vessel. In Fig. 2 is shown in section one well-known form of automatic regulator, consisting of a casing composed of two parts 2 3, bolted together and clamping a diaphragm 4, which forms two chambers 5 6 and which has attached to it the stem 7 of a valve 8, coöperating with a port or passage 9, leading from the gas-inlet pipe 10 into the chamber 6, the said chamber having the gas-outlet pipe B connected to it. The back of the diaphragm is acted upon by a spring 12, the tension of which is regulated by an adjusting-screw 13, according to the pressure of gas it is desired should close the valve. Normally the pressure of the spring 12 opens the valve 8 and admits gas from the cylinder A into the chamber 6 and thence through the pipe B into the vessel C, and if carbonated water is not being drawn off from the vessel C the gas in the chamber 6, acting upon the large area of the diaphragm, which is many times that of the valve 8, moves the said valve to its seat and closes the port or passage 9. When the pressure of gas in the chamber 6 and vessel C is reduced by drawing off carbonated water, the spring 12 opens the valve 8 to admit a fresh supply of gas into the vessel C. The regulator shown in section in Fig. 2 is conventionally represented in Fig. 1. The water admitted to the vessel C by the cock $j^3$ may be automatically maintained at a uniform level by the float $j$, connected to the plug of the cock by the rods $j^2$. On the vessel C may be located a valve $k$, which may be suitably weighted, so as to open when the supply of gas is shut off, but so as to close when the gas is entering the vessel. This arrangement provides for automatically venting the vessel for the escape of residual air or gas when the liquid is flowing into the vessel, but which is closed immediately when the gas is admitted therein at a higher pressure.

If the pressure of the water available is not sufficient to cause it to enter the vessel C or in case it is not convenient to connect the apparatus to a main water-supply, there may be provided an injector arrangement, as shown at $l$, by means of which the water may be injected by the pressure of the gas from the container A; or a pump (not herein shown) may be provided, which is worked by the pressure of the gas so as to force water from any suitable source into the vessel C, in which case a check-valve is provided in the water-feed pipe to prevent the return of water through said pipe when the gas and water are not entering. The injector or pump may be constructed to work automatically when the level of the water in the vessel C is below the normal by means of the float $j$, operating the plug-valve $j^3$, so as to admit of the pressure of the gas to the injector or pump, as the case may be.

The vessel C is provided with an outlet-pipe $m$ for the charged water, fitted with the stop-cock $m^2$. It is not essential to provide a float to operate the valve controlling the water-inlet, as the discharge-cock $m^2$ may be connected in any suitable manner to the valve of the water-inlet pipe, so that when the aerated water is being withdrawn from the vessel C the water-inlet cock will be opened, and when the discharge-cock is closed the water-inlet pipe will be simultaneously closed. The vessel C may be supplied with water to the required level through a screw-tap and the gas turned on and left on until the water is saturated therewith.

By reference to the drawings it will be seen that the layer of gas in each trap or pocket, as well as the contiguous layer of water, is quiet and in a static condition and that even when the charged water is being drawn off and gas is being admitted the pockets or traps are kept full of gas, so that the charging chamber or vessel C contains a continuous body of liquid within which is a series of layers of gas, and a substantially large surface or area of water is in direct contact with the layers of gas, and, further, it will be seen that the water admitted into the vessel is spread out and distributed across the vessel and passes down through the volume of gas contained in the upper part of the vessel, which facilitates and insures the absorption of the gas by the water, whereby a substantially continuous supply of highly-charged water may be obtained from an apparatus embodying this invention.

I claim—

1. An apparatus for charging liquids with gas, which consists of a closed vessel provided with a liquid-inlet pipe having a valve automatically controlled by the level of the liquid in said chamber, so as to leave a gas-chamber in the upper part of said vessel, a gas-inlet pipe discharging into said vessel near the bottom thereof, a liquid-outlet pipe for said vessel, a vertically-arranged series of traps for the gas located in the lower part of said vessel above the gas-inlet pipe and immersed in the liquid to form layers of gas in contact with layers of liquid forming part of the body of liquid in the said chamber, and a distributer for the liquid located in the gas-chamber or upper part of said vessel, substantially as described.

2. An apparatus for charging liquids with gas, which consists of a closed vessel provided with a liquid-inlet and with a liquid-outlet pipe, a series of superimposed traps in said vessel immersed in a continuous body of liquid in said vessel to form independent layers of gas in said body of liquid and provided with passages from one trap to an adjacent trap, a gas-inlet pipe for said vessel to admit gas therein below said traps, and a distributer for the water located in the upper part of said vessel above the level of the liquid therein, substantially as described.

3. An apparatus for charging liquids with gas, which consists of a closed vessel C provided with a water-inlet pipe having a valve automatically controlled by the level of the water in said vessel, and with a water-outlet pipe, a series of superimposed traps in the lower part of said vessel immersed in a body of liquid therein and provided with one or more passages in their bottom having their walls extended into said traps, and a gas-inlet pipe communicating with said chamber below said traps, substantially as and for the purpose specified.

4. An improvement in the method of charging liquids with gas, which consists in admitting gas and liquid into a closed vessel at opposite ends thereof, and retarding the flow of gas up through said vessel so as to form a vertical series of alternate layers of gas and liquid with the gas layers in a substantially static condition immersed in a single or continuous body of liquid, and distributing the liquid admitted into the vessel through a volume of gas in the upper part of said vessel, substantially as described.

5. A closed vessel containing in its lower part a body of liquid and in its upper part a body or volume of gas capable of absorption in said liquid, a liquid-inlet at top of said vessel, means for spreading liquid as it passes through the volume of gas, a gas-inlet discharging into said vessel at its bottom and means immersed in the body of liquid for statically spreading the gas in said body of liquid, substantially as described.

6. A closed vessel containing in its lower part a body of liquid and in its upper part a body or volume of gas capable of absorption in said liquid, a liquid-inlet at top of said vessel, means for spreading liquid as it passes through the volume of gas, a gas-inlet discharging into said vessel at its bottom, and means immersed in the body of liquid for statically spreading the gas in said body of liquid, a valve to control the supply of liquid, a float in said vessel and means connecting said float to said valve, substantially as described.

7. In an apparatus for charging liquids with gas, the combination with a closed absorption vessel provided with a liquid-inlet at its top, and with a vertically-arranged series of traps in its lower part, which are immersed in the liquid in said vessel, of a charging vessel containing gas under pressure and provided with a pipe connected to the absorption vessel at its bottom below said traps, and a gas-regulator in said outlet for the charging vessel, substantially as described.

8. In an apparatus for making aerated liquors or beverages, the combination of the following instrumentalities, viz: a vessel for containing compressed carbonic-acid gas provided with a gas-outlet pipe, a mixing vessel or chamber into which the said gas-outlet discharges the gas near the bottom thereof, a liquid-inlet at the top of said mixing chamber or vessel, the said gas being admitted into said mixing vessel at a pressure not greater than that at which the liquid is admitted, and a series of superimposed traps in said vessel immersed in a continuous body of liquid in said vessel to form layers of gas in said body of liquid, substantially as described.

In testimony whereof I have signed my name to this specification in the presence of two subscribing witnesses.

JOHN SCHWARTZ, JR.

Witnesses:
JOHN T. KNOWLES,
ALEXANDER W. ALLEN.